(12) United States Patent
Scarritt, II et al.

(10) Patent No.: US 12,179,652 B1
(45) Date of Patent: Dec. 31, 2024

(54) TRANSPORT VEHICLE FOR STACKABLE CHAIRS

(71) Applicant: Perdido Beach Services, Inc., Orange Beach, AL (US)

(72) Inventors: Russell T. Scarritt, II, Orange Beach, AL (US); Harris Oswalt, Mobile, AL (US); Austin Green, Mobile, AL (US); Richard Thai, Katy, TX (US)

(73) Assignee: Perdido Beach Services, Inc., Orange Beach, AL (US)

( * ) Notice: Subject to any disclaimer, the term of this patent is extended or adjusted under 35 U.S.C. 154(b) by 289 days.

(21) Appl. No.: 17/943,372

(22) Filed: Sep. 13, 2022

(51) Int. Cl.
| | | |
|---|---|---|
| *B60P 1/64* | (2006.01) | |
| *B60P 1/38* | (2006.01) | |
| *B60P 1/43* | (2006.01) | |
| *B61D 47/00* | (2006.01) | |
| *B62D 33/04* | (2006.01) | |

(52) U.S. Cl.
CPC .............. *B60P 1/6436* (2013.01); *B60P 1/38* (2013.01); *B60P 1/43* (2013.01); *B60P 1/6418* (2013.01); *B61D 47/00* (2013.01); *B62D 33/042* (2013.01)

(58) Field of Classification Search
CPC ...... B60P 1/43; B60P 1/00; B60P 3/00; B60P 1/435; B60P 1/6436; B60P 1/14; B60P 1/6418; B62D 33/042; B62D 53/0857; B61D 47/00; B61D 47/005; B65D 90/0033; B65D 88/022; B65D 88/027; B65D 19/44; B65D 88/127; B65D 88/129; B65G 67/30; B65G 67/32; B65G 67/08; B65G 67/10

USPC ............................ 410/32, 35, 46; 298/13, 18
See application file for complete search history.

(56) References Cited

U.S. PATENT DOCUMENTS

| | | | | |
|---|---|---|---|---|
| 4,708,572 | A * | 11/1987 | Kolker | B60P 3/055 160/23.1 |
| 5,183,372 | A * | 2/1993 | Dinverno | B25H 3/00 280/47.35 |
| 5,273,337 | A * | 12/1993 | Herrmeyer | B60P 3/00 296/3 |
| 11,040,828 | B1 * | 6/2021 | Ward | B65G 63/025 |
| 2020/0071066 | A1 * | 3/2020 | Chang | B65D 88/027 |
| 2021/0347587 | A1 * | 11/2021 | Levi | B65G 67/20 |

FOREIGN PATENT DOCUMENTS

FR 2719527 A1 * 11/1995 ................ B60P 1/36

OTHER PUBLICATIONS

U.S. Appl. No. 17/943,331, filed Sep. 13, 2022, to Russell T. Scarritt.

* cited by examiner

*Primary Examiner* — Daniel J Colilla
(74) *Attorney, Agent, or Firm* — AdamsIP, LLC; Stephen Thompson; J. Hunter Adams

(57) ABSTRACT

A vehicle that may be used for loading, unloading, transport, and storage of stackable chairs such as beach lounge chairs and a method of using the vehicle for transporting chairs are provided. The transport vehicle has movable drawers that are designed to support stacks of chairs. The drawers are mounted on tracks and may be moved into and out of compartments that are open on a lateral side of the vehicle so that stacks of chairs may be loaded into and unloaded out of each of the compartments. The drawers may be moved manually by a user or may be motorized.

20 Claims, 11 Drawing Sheets

TRANSPORT VEHICLE FOR STACKABLE CHAIRS

FIELD OF THE DISCLOSURE

The present disclosure relates generally to a vehicle that may be used for loading, unloading, transport, and storage of stackable chairs such as beach lounge chairs.

BACKGROUND

Beach chairs and umbrellas are often used by beachgoers to provide a place to sit off of the sand and to provide protection from the sun. One of the most commonly used types of beach chairs is an outdoor lounge chair, also referred to as a lounger, having an adjustable chair back. At some beach areas, large numbers of identical beach chairs may be deployed throughout a beach area for beachgoers to use during the day. When the chairs are not in use, they are typically transported manually to a different area of the beach for overnight storage, or the chair frames are left on the beach and the cushions are removed and stored. The chairs and/or cushions may then be returned to the beach the following day for use. However, many beachfront property owners and environmentalists desire beaches to be free of chairs between the dunes and shoreline when the chairs are not being actively used, thereby requiring large numbers of chairs to be moved entirely off of the beach on a daily basis. The process of manually moving a large number of chairs is both labor intensive and time consuming.

SUMMARY

In one aspect, a transport vehicle that may be used for loading, unloading, transport, and storage of stackable chairs and a method of using the transport vehicle to transport chairs are provided. The transport vehicle is designed to allow entire stacks of chairs to be loaded onto the vehicle and unloaded from the vehicle as a group so as to minimize the time and manpower required to transport and store a large number of chairs.

The transport vehicle comprises a generally horizontal bed operatively connected to wheels configured to move the vehicle in a conveyance direction. The transport vehicle further comprises a plurality of chair compartments disposed on a top side of the bed. Each chair compartment is sized to receive a vertical stack of chairs into the chair compartment for transport and/or storage. The transport vehicle further comprises a plurality of retractable drawers each associated with a respective one of the chair compartments. Each of the drawers is sized and shaped to support a stack of chairs and to retain the stack of chairs generally in a laterally and longitudinally fixed position relative to the drawer. Each of the drawers comprises a drawer frame that is slidably connected to a track that is mounted on the top side of the bed, and each of the drawers is configured to move into and out of one of the chair compartments between a loading position in which the drawer is extended outside the chair compartment and a storage position in which the drawer is fully retracted into the chair compartment. In the loading position, chairs may be loaded onto or unloaded off of a drawer. In the storage position, chairs may be stored within the transport vehicle or transported to a different location. Each of the drawers moves back and forth along the track between the loading and storage positions, preferably in a direction that is transverse to the conveyance direction of the transport vehicle. When each drawer is in the loading position, chairs may be loaded onto the vehicle by stacking chairs on each of the drawers and may be unloaded from the vehicle by removing chairs from a drawer on which chairs are stacked. When a drawer is moved to the loading position, one end of the drawer frame may be placed onto a ground surface adjacent to the vehicle for loading chairs onto or unloading chairs off of the drawer. After either loading chairs onto a drawer or unloading chairs from a drawer, each drawer may then be moved to the storage position by retracting the drawer back into the chair compartment with which the drawer is associated.

The transport vehicle further comprises a system designed to retract each of the drawers back into one of the chair compartments. In one preferred embodiment, the transport vehicle may comprise a winch that is attached to the vehicle. A line is operatively connected to the winch and to one of the drawers, and the winch is configured to retract the drawer to which the line is connected from the loading position to the storage position in which the drawer is disposed fully within a chair compartment. In this embodiment, the vehicle preferably further comprises a first pulley connected to a vehicle frame and a second pulley connected to one of the drawers. The line runs through the first and second pulleys, and the pulleys are configured to guide the line when the winch is activated to retract the drawer to which the line is connected. In a preferred embodiment, the winch may comprise a hand crank designed to manually operate the winch. The vehicle may comprise a winch for each one of the chair compartments to operate each one of the drawers.

In another preferred embodiment, the transport vehicle may comprise a motor mounted onto the vehicle and operatively connected to a drive belt configured to drive motion of one of the drawers back and forth between the loading position and the storage position. The vehicle may comprise a motor and drive belt for each one of the chair compartments to operate each one of the drawers.

The transport vehicle preferably also has a separate umbrella compartment sized to receive collapsible umbrellas within the umbrella compartment so that umbrellas that are commonly used by beachgoers with loungers may also be loaded, unloaded, and transported using the vehicle when transporting chairs.

Further embodiments and features, as well as the structure and operation of various embodiments are described in detail below with reference to the accompanying drawings. It should be understood that the summary above is provided to introduce, in simplified form, a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. References to "one embodiment", "an embodiment", "some embodiments", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "comprises" and "includes", and grammatical equivalents thereof are open-ended and are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 6:
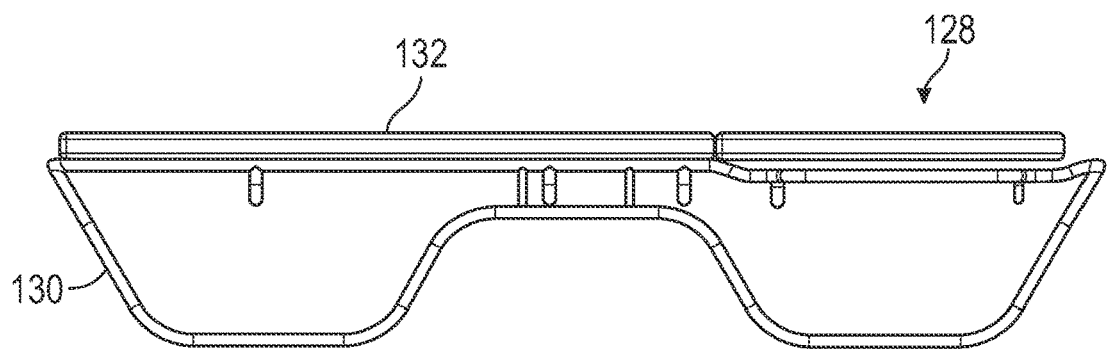
FIG. 6 is a side view of a single stackable chair in accordance with the present disclosure.
Figure 7:
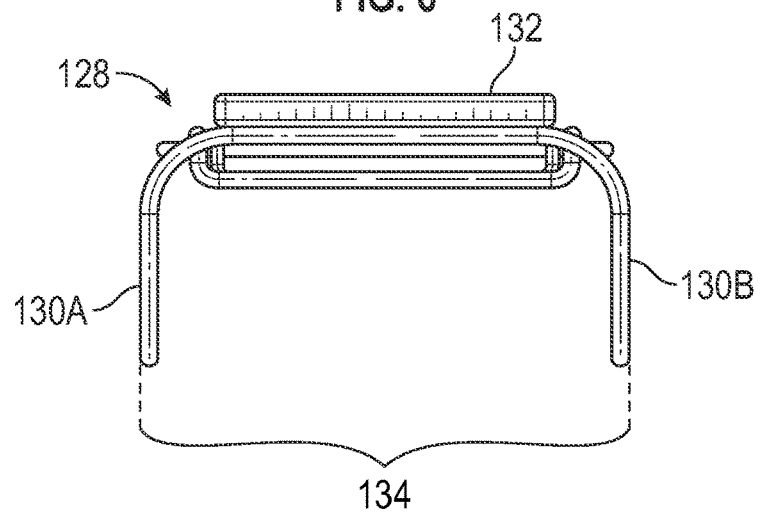
FIG. 7 is a front view of a single stackable chair in accordance with the present disclosure.

Turning to the drawings, FIGS. 1-4 and 9-10 show embodiments of a transport system 100 that includes a transport vehicle 102 and a plurality of stackable chairs 128. The transport vehicle 102 may be used for loading, unloading, transport, and storage of the chairs 128, which are shown in stacks 138 loaded onto drawers 140 that are movable for loading and unloading of the chairs 128 onto and off of the transport vehicle 102 for transport or storage. FIGS. 6 and 7 show an individual chair 128 that is configured to be stacked vertically with other chairs 128 to form a stack 138 of chairs that can be loaded onto or unloaded off of the transport vehicle 102. The transport vehicle 102 is designed to allow entire stacks 138 of chairs 128 to be loaded onto the vehicle 102 and unloaded from the vehicle as a group so as to minimize the time and manpower required to transport and store a large number of chairs 128.

Figure 1:
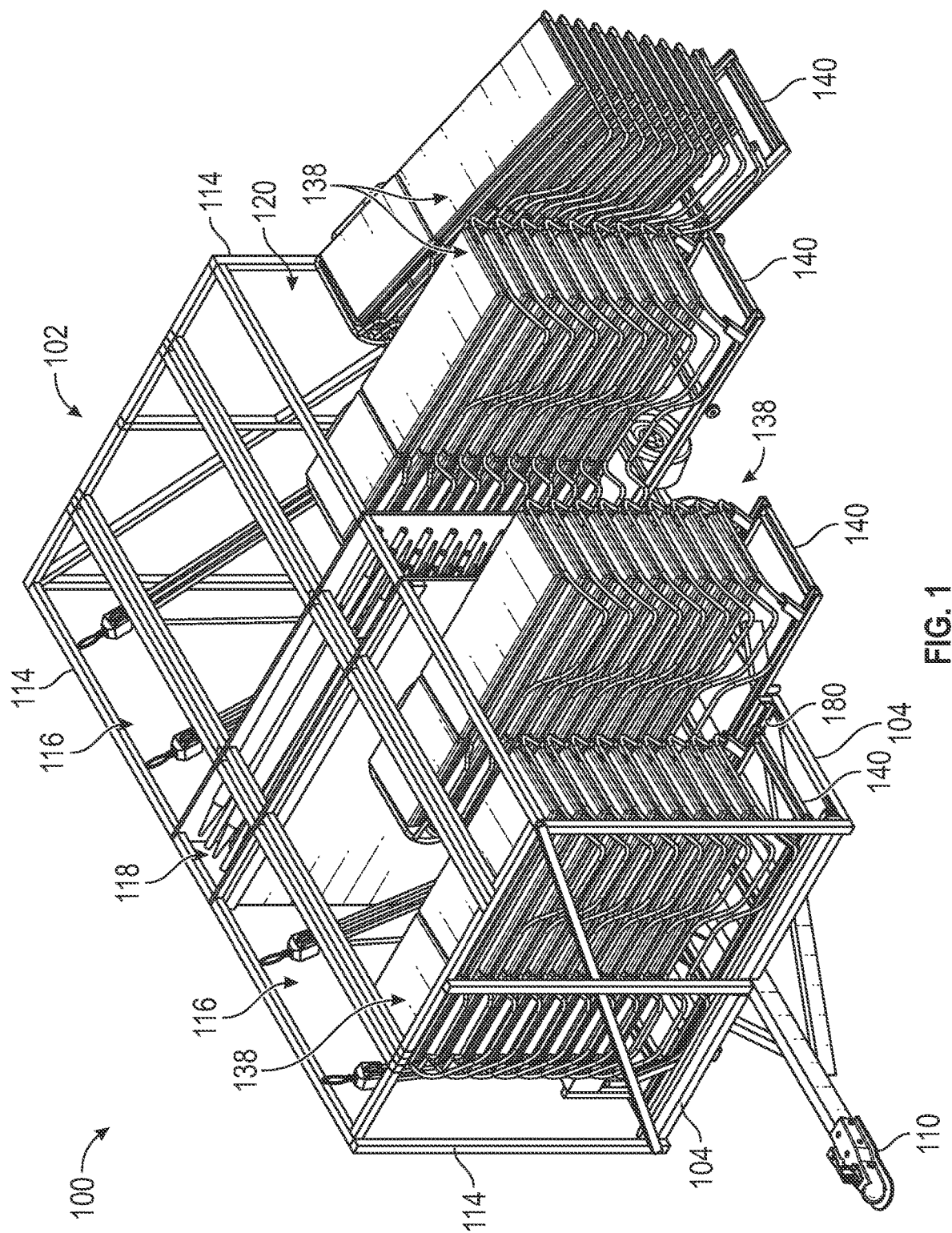
FIG. 1 is a perspective view of a transport vehicle for stackable chairs utilizing a pulley system for loading chairs in accordance with the present disclosure.
Figure 3:
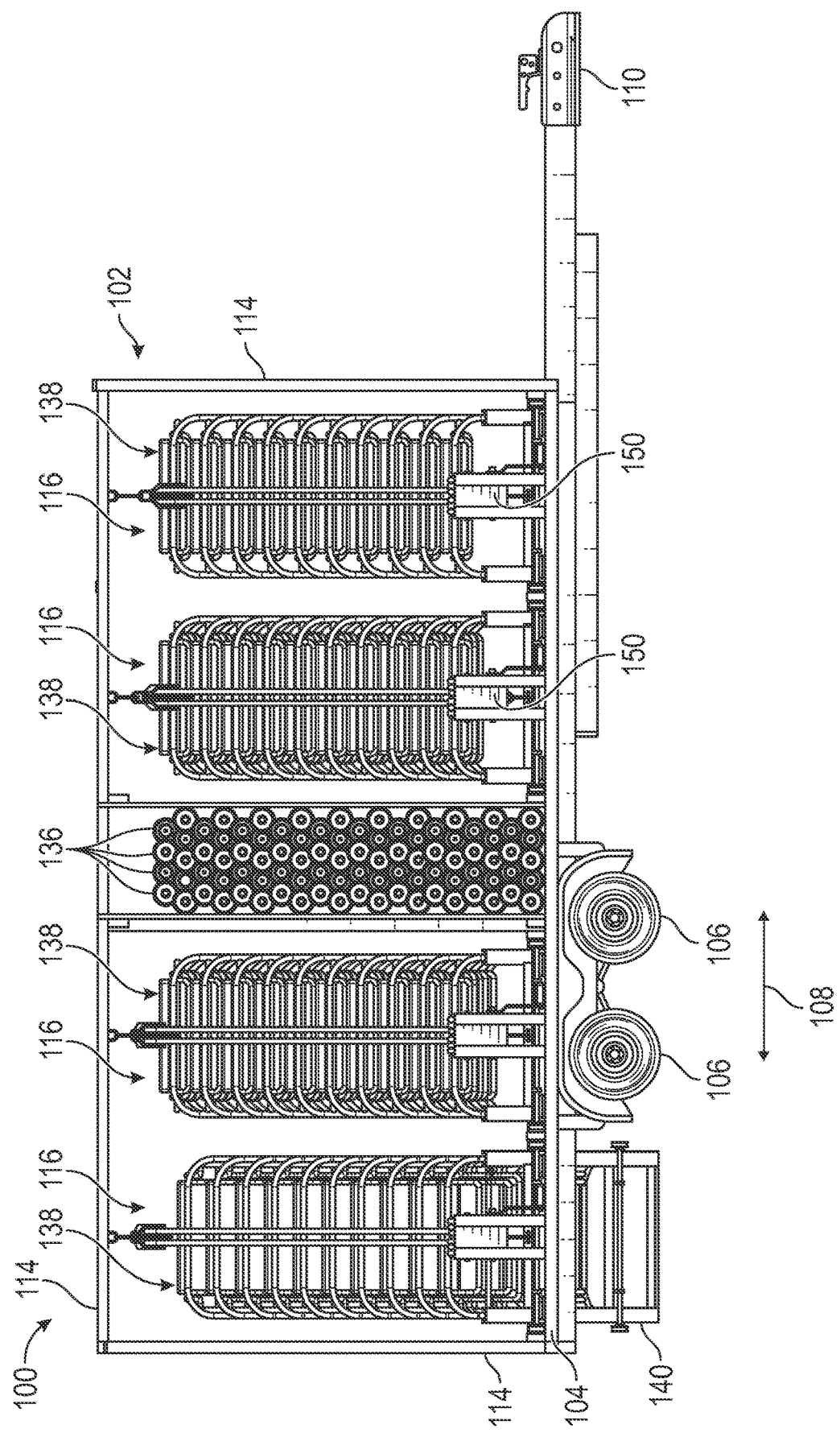
FIG. 3 is a side elevational view of a transport vehicle for stackable chairs utilizing a pulley system for loading chairs in accordance with the present disclosure.
Figure 4:
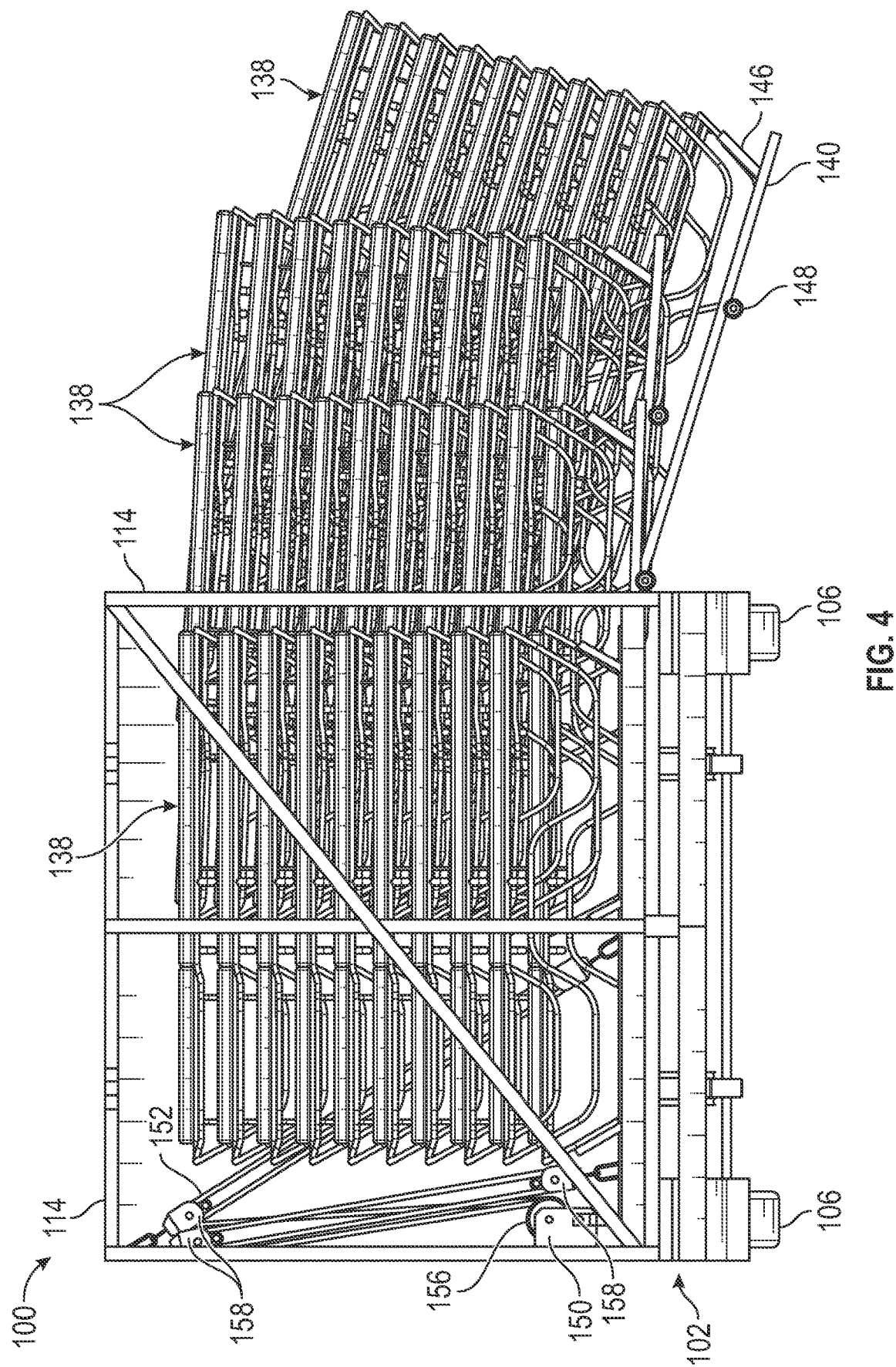
FIG. 4 is a rear elevational view of a transport vehicle for stackable chairs utilizing a pulley system for loading chairs in accordance with the present disclosure.
Figure 5:
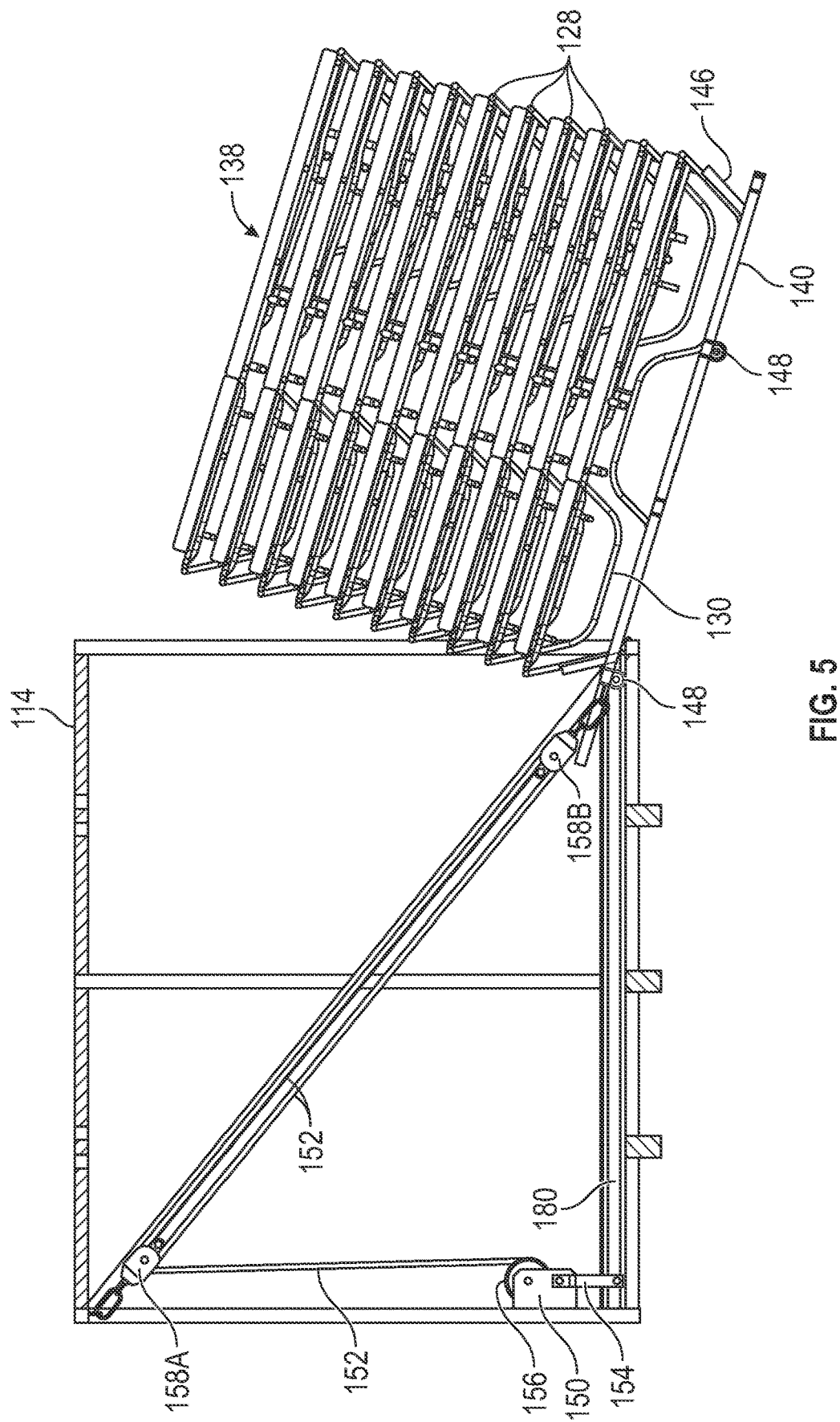
FIG. 5 is a partial rear elevational view of a transport vehicle for stackable chairs utilizing a pulley system for loading chairs in accordance with the present disclosure.
Figure 8:
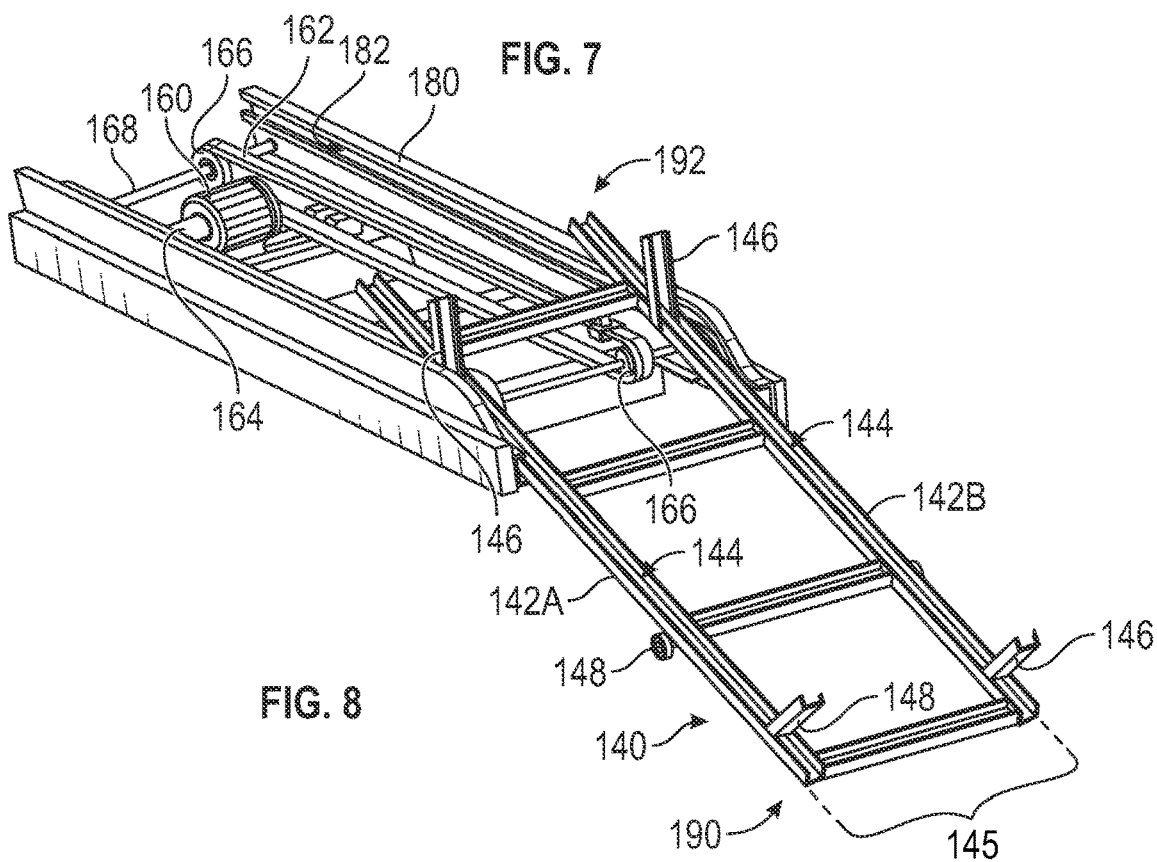
FIG. 8 is a partial perspective view of a drawer used for supporting a stack of chairs in accordance with the present disclosure.
Figure 9:
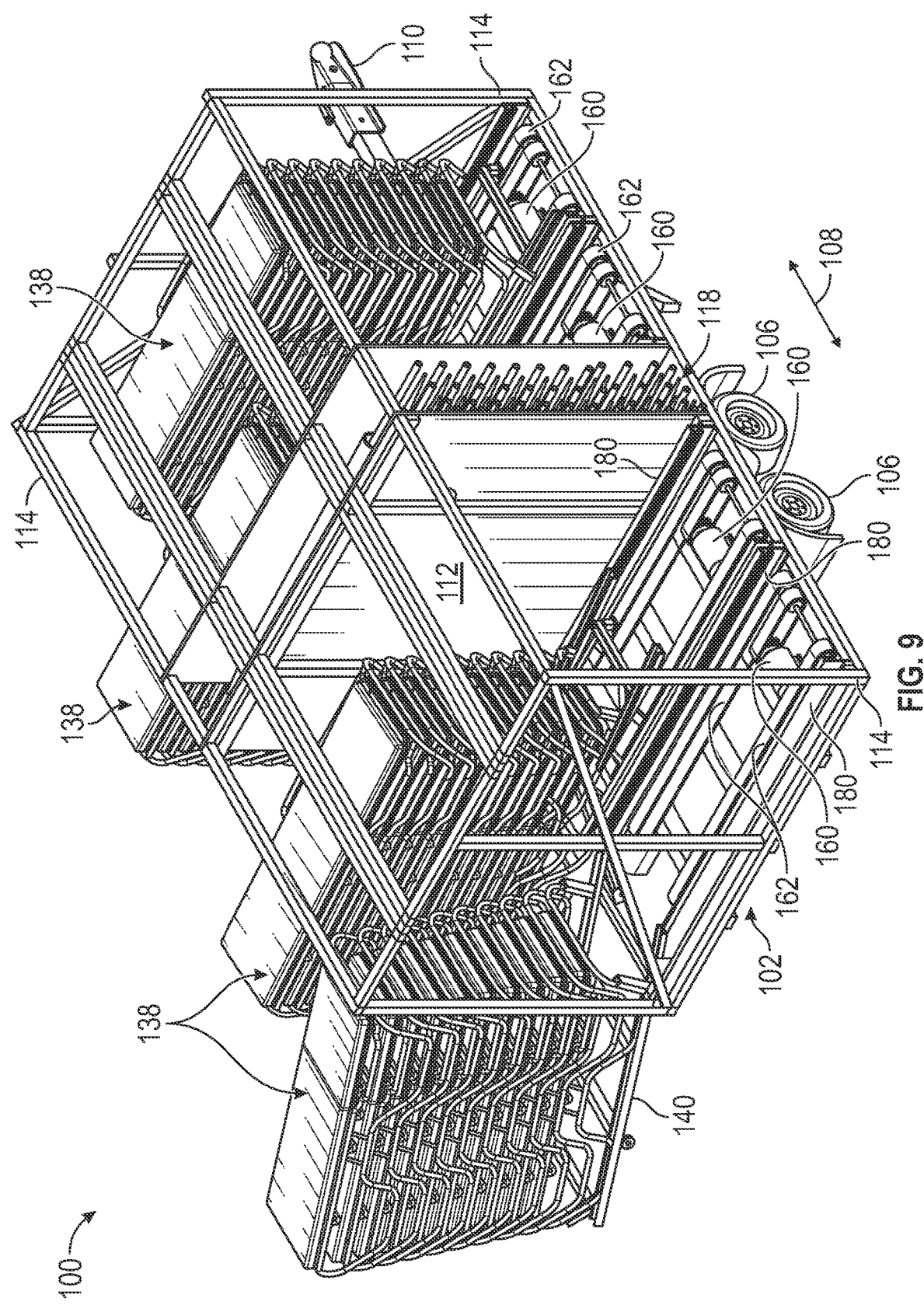
FIG. 9 is a perspective view of a transport vehicle for stackable chairs utilizing a motorized system for loading chairs in accordance with the present disclosure.

The drawers 140 of the transport vehicle 102 are designed to move back and forth relative to chair compartments 116 in which chairs 128 may be held for transport and/or storage. Each of the drawers 140 is configured to move into and out of one of the chair compartments 116 between a loading position in which the drawer 140 is extended outside the chair compartment 116 and a storage position in which the drawer 140 is fully retracted into the chair compartment 116. In the loading position, chairs 128 may be loaded onto or unloaded off of a drawer 140. In the storage position, chairs 128 may be stored within the transport vehicle 102 or transported to a different location. Each of the drawers 140 moves along a track 180 between the loading and storage positions. FIGS. 1-5 illustrate one preferred embodiment in which the transport vehicle 102 may comprise winches 150 designed to move the drawers 140. FIGS. 8-14 illustrate another preferred embodiment in which the transport vehicle 102 may comprise motors 160 designed to drive motion of the drawers 140. FIGS. 1 and 9 show the drawers 140 in various positions between the storage position (in the chair compartment 116 closest to hitch 110) and the loading position (in the chair compartment 116 closest to a rear end of the vehicle 102). FIGS. 5 and 11 show a single drawer 140 in the loading position.

As shown in FIGS. 6 and 7, each individual chair 128 comprises a frame 130 that may be used to support one or more cushions 132 for a user to sit or lie down on. As best seen in FIG. 3, all of the chairs 128 of the plurality of chairs are of the same type and generally have the same dimensions and configuration, which is designed to allow the chairs 128 to be stacked vertically with each other to form a stack 138 of chairs. In a preferred embodiment, the chairs 128 are loungers, though it should be understood that the chairs may comprise other types of chairs that have different configurations that allow the chairs to be stacked vertically. As best seen in FIG. 7, the frame 130 of each chair 128 preferably comprises two opposing frame members 130A and 130B. Each frame 130 has a width 134 that is defined by a distance between outer edges of the opposing frame members 130A and 130B.

Figure 2:
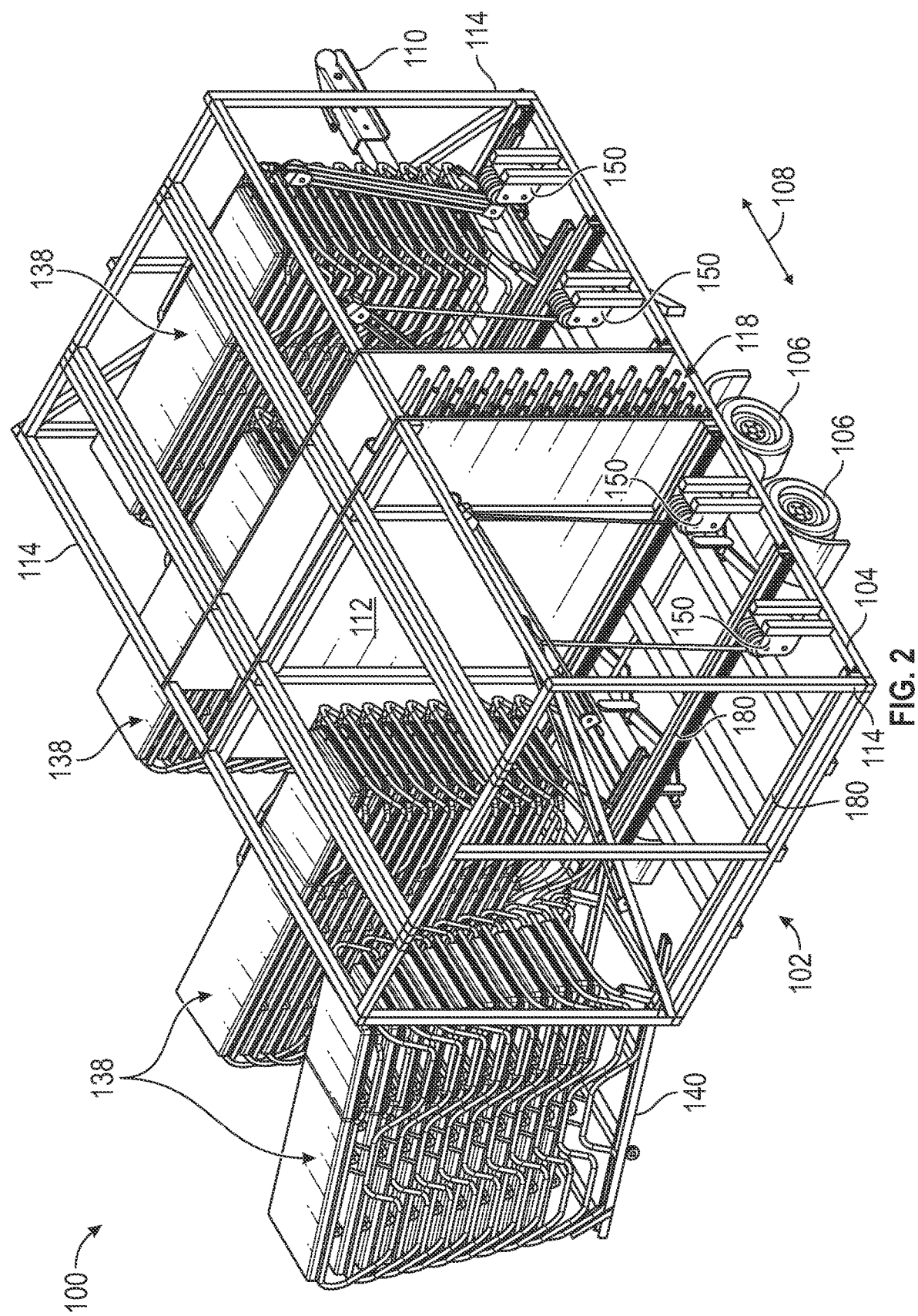
FIG. 2 is a perspective view of a transport vehicle for stackable chairs utilizing a pulley system for loading chairs in accordance with the present disclosure.

The transport vehicle 102 comprises a generally horizontal bed 104 operatively connected to wheels 106 configured to move the vehicle 102 in a conveyance direction 108. The types of wheels 106 installed on the vehicle 102 may be selected for use in sandy environments where beach chairs 128 are commonly used. The transport vehicle 102 further comprises a plurality of chair compartments 116 disposed on a top side of the bed 104. Each chair compartment 116 is sized to receive a vertical stack 138 of chairs into the chair compartment for storage within the vehicle 102 and/or for transportation using the vehicle 102. In a preferred embodiment, each stack 138 includes at least ten chairs 128 stacked on top of each other, and each chair compartment 116 is sized to receive the stack 138 of chairs 128. The number of chairs 128 in a stack 138 and the height of each chair compartment 116 may be varied so that the vehicle 102 may be used to transport stacks 138 of varying numbers of chairs 128. As best seen in FIG. 2, the bed 104 may comprise a frame structure that is open, or the bed 104 may optionally comprise a floor structure that is not open. The transport vehicle 102 is designed so that the bed 104 is disposed in a generally horizontal position, although the bed 104 may deviate from a horizontal position during normal operation of the vehicle 102.

In a preferred embodiment, as best seen in FIGS. 1 and 2, the transport vehicle 102 further comprises a frame 114 that extends upwardly from the bed 104. The chair compartments 116 may be defined at least partially by the frame 114 of the vehicle 102. As shown in FIG. 1, the transport vehicle 102 has an open side 120 along a lateral side 120 of the vehicle 102 through which stacks 138 of chairs may be loaded and unloaded. As best seen in FIG. 3, in one preferred embodiment, the vehicle 102 may include four chair compartments 116 so that the vehicle 102 may be used to transport or store four stacks 138 of chairs, though the number of compartments 116 may vary and still fall within the scope of the present disclosure.

In a preferred embodiment, the transport system 100 further comprises a plurality of collapsible umbrellas 136, and the transport vehicle 102 further comprises a separate umbrella compartment 118 sized to receive the plurality of umbrellas 136 within the umbrella compartment 118, as best seen in FIG. 3. The umbrella compartment 118 also has an open side along the lateral side 120 of the vehicle 102 such that the plurality of umbrellas 136 can be loaded into the umbrella compartment 118 and unloaded from the umbrella compartment 118 in a direction that is transverse to the conveyance direction 108. In a preferred embodiment, the umbrella compartment 118 is disposed between chair compartments 116, and the vehicle 102 preferably has two chair compartments 116 disposed on either side of the umbrella compartment 118. The umbrella compartment 118 may be separated from adjacent chair compartments 116 by divider walls 112, which may support the plurality of umbrellas 136 within the umbrella compartment 118, as best seen in FIG. 3. Additional walls may optionally be installed on the frame 114 to delineate chair compartments 116. Walls may optionally be installed on both sides of each chair compartment 116 and optionally on a top side of the frame 114 to form a roof. However, as best seen in FIG. 3, individual adjacent compartments 116 may not be separated by structural divider walls, but may be delineated by the positioning of fixed tracks 180 on which the drawers 140 move. A removable awning may optionally be utilized to cover the open lateral side 120 of the vehicle 102 when chairs are not being loaded or unloaded. A second removable awning may also be utilized to cover the lateral side of the vehicle 102 opposite the open side 120, though a fixed wall is preferably not installed on the opposite lateral side so that a user may access the winches 150 or motors 160 of the vehicle 102 when loading or unloading chairs 128.

In a preferred embodiment, as best seen in FIGS. 1 and 3, the transport vehicle 102 is a trailer having a hitch 110 so that the vehicle 102 may be hitched to a powered tow vehicle for moving the trailer to transport the chairs 128. In alternative embodiments, the transport vehicle 102 may be powered directly rather than being towed by a separate vehicle. For instance, the transport vehicle 102 may be a truck having a combustion engine and having a truck bed being modified as described herein for use in transporting chairs 128. Alternatively, the transport vehicle 102 may be a battery-powered vehicle, such as a golf cart modified for transporting chairs 128.

As best seen in FIGS. 1 and 2, the transport vehicle 102 comprises a plurality of retractable drawers 140. Each drawer 140 is associated with a respective one of the chair compartments 116. FIGS. 1, 2, and 4 show the drawers 140 in various positions between being fully retracted into a chair compartment 116 and being extended outside of a chair compartment 116. Each of the drawers 140 comprises a drawer frame 142 that is slidably connected to a track 180 that is mounted on the top side of the bed 104. Each of the drawers 140 is configured to move into and out of one of the chair compartments 116 between the loading position in which the drawer 140 is extended outside the chair compartment 116 and the storage position in which the drawer 140 is retracted into the chair compartment 116. Each drawer 140 is configured to move back and forth between the loading and storage positions along the track 180 through the open lateral side 120 of the vehicle 102, preferably in a direction that is transverse to the conveyance direction 108 of the transport vehicle 102. In a preferred embodiment, the direction in which the drawers 140 move that is transverse to the conveyance direction 108 is generally perpendicular to the conveyance direction 108. FIG. 8 shows one of the drawers 140 with one of the tracks 180 separate from the vehicle 102. In FIG. 8, the drawer 140 and track 180 are shown with a motor 160 for moving the drawer 140, though the drawer and track 180 may also be utilized with a winch 150. Each drawer 140 may be moved out of its respective chair compartment 116 into the loading position to load chairs 128 onto the vehicle 102 by stacking chairs 128 on each of the drawers 140 and to unload chairs 128 from the vehicle 102 by removing chairs 128 from a drawer 140 on which chairs 128 are stacked. When a drawer 140 is moved into the loading position, one end 190 of the drawer frame 142 may be placed onto a ground surface adjacent to the vehicle 102 for loading chairs 128 onto or unloading chairs 128 off of the drawer 140. After either loading chairs 128 onto a drawer 140 or unloading chairs 128 from a drawer 140, each drawer 140 may then be moved into the storage position by retracting the drawer 140 back into the chair compartment 116 with which the drawer 140 is associated.

As best seen in FIG. 8, each of the drawers 140 is sized and shaped to support a stack 138 of chairs 128 and to limit lateral and longitudinal movement of the stack 138 of chairs 128 relative to the drawer 140. Thus, each drawer 140 may retain a stack 138 of chairs 128 generally in a laterally and longitudinally fixed position relative to the drawer 140. Each of the drawers 140 may comprise two opposing drawer frame members 142A and 142B disposed parallel to each other. Each of the drawer frame members 142A and 142B may comprise opposing structural elements extending upwardly from the members 142A and 142B that generally correspond to the width 134 of each chair frame 130 so that the structural elements limit lateral movement of the chair frame 130 when the chair frame members 130A and 130B are placed onto members 142A and 142B. In a preferred embodiment, each of the drawer frame members 142 has a groove 144 on an upper side of the drawer frame member 142. Each of the grooves 144 is sized to receive a respective one of the chair frame members 130A and 130B of a bottom chair 128 of the stack of chairs 138 into the groove 144. Thus, the drawer frame 142 has a width 145 between frame members 142A and 142B that generally corresponds to the width 134 between opposing chair frame members 130A and 130B. When the chair frame members 130A and 130B are placed within the grooves 144 of the drawer frame members 142A and 142B, the grooves 144 limit lateral movement of the bottom chair 128 of the stack of chairs 138 and thus generally retain the bottom chair 128 of the stack 138 in a laterally fixed position relative to a longitudinal axis of the drawer 140 extending from one end 190 to an opposing end 192 of the drawer 140.

In a preferred embodiment, the drawer frame 142 of each drawer 140 comprises a plurality of retaining members 146 each attached to and extending upwardly from a respective one of the drawer frame members 142A and 142B. The retaining members 146 are designed to limit longitudinal movement of the stack 138 of chairs along the drawer frame members 142. The shape and positioning of the retaining members 146 may be adjusted to fit to chairs 128 having frames 130 of a specific design so that the retaining members 146 contact the frame 130 of the bottom chair 128 of a stack 138 or are in close proximity to the chair frame 130, as best seen in FIG. 5, so that the retaining members 146 limit longitudinal movement of the chair 128 that may occur due to the chair frame 130 sliding within the grooves 144 of the drawer frame 142. The retaining members 146 may also have grooves on an inner facing surface to receive chair frame members 130A and 130B therein, which help to further limit lateral movement of the chairs 128 on the drawer 140. Thus, the grooves 144 and retaining members 146 may function to limit lateral and longitudinal movement of a stack 138 of chairs 128 relative to the drawer 140 in which the stack 138 is placed, thereby generally retaining the stack 138 of chairs in a laterally and longitudinally fixed position. However, each drawer 140 is designed to allow a chair 128 to be lifted upwardly from the frame 142 or placed downwardly onto the frame 142. Due to the height of a fully formed stack 138 of chairs, chairs 128 toward the upper end of a stack 138 may tilt to some degree during normal operation of the vehicle 102 due to uneven terrain encountered during transportation, but the bottom chair 128 resting directly on the drawer 140 may be retained in a generally fixed position relative to the drawer 140, which limits the extent of any potential tilting of the stack 138 within the chair compartment 116.

The track 180 to which each drawer 140 is slidably connected preferably comprises two opposing track members 180 disposed parallel to each other for supporting each of the frame members 142A and 142B. In a preferred embodiment, as best seen in FIG. 8, each track member 180 preferably has a longitudinal groove 182 on an internally facing side of the track member 180, and each drawer frame 142 may comprise a set of opposing rollers 148 designed to fit within the track grooves 182 and roll inside the grooves 182 so that the drawer 140 moves back and forth longitudinally along the track 180. In one embodiment, as best seen in FIG. 5, each drawer 140 may comprise two sets of rollers 148. Each track member 180 is preferably open at both ends 186 so that one pair of rollers 148 may exit the track grooves 182 when a drawer 140 is moved out of its corresponding chair compartment 116 into the loading position. When the drawer 140 is moved into the loading position, a first end 190 of the drawer 140 may be lowered relative to the track 180, as best seen in FIGS. 5 and 8, so that the end 190 rests on a ground surface for loading and unloading chairs 128 onto and off of the drawer 140. When the drawer 140 is retracted back into the storage position within its corresponding chair compartment 116, the rollers 148 may then reenter the track grooves 182 at an open end 186 of the track 180. Each drawer 140 may thus be disconnected from the track 180 by sliding the drawer 140 out the track grooves 182 and then reconnected by sliding the drawer 140 back into the track grooves 182.

The transport vehicle 102 further comprises a system designed to retract each of the drawers 140 back into one of the chair compartments 116, which moves each drawer 140 into the storage position. In one preferred embodiment, as shown in FIGS. 1-5, the transport vehicle 102 comprises a winch 150 that is attached to the vehicle 102. The winch 150 may preferably be attached to frame 114. As best seen in FIG. 2, the vehicle 102 preferably comprises a plurality of winches 150 such that one winch 150 is associated with each respective chair compartment 116 and is utilized for each respective drawer 140. FIG. 5 shows a partial cross-sectional view of the vehicle 102 in which one winch 150 is shown being utilized for one drawer 140. A line 152 is operatively connected to the winch 150 and to the drawer 140, and the winch 150 is configured to retract the drawer 140 to which the line 152 is connected from the loading position to the storage position. Each winch 150 comprises a spool 156 to which one end of the line 152 is connected and around which a portion of the line 152 is coiled. In a preferred embodiment, as best seen in FIG. 5, the vehicle 102 comprises pulleys 158 through which the line 152 may be run to operatively connect the line 152 to the drawer 140. The vehicle 102 may comprise a first pulley 158A connected to the vehicle frame 114 and a second pulley 158B connected to the drawer 140. Preferably, the first pulley 158A may be connected to the frame 114 in an elevated position relative to the drawer 140, and the second pulley 158B may be connected to the drawer 140 at the end 192 opposite the end 190 that may be pulled out of the chair compartment 116 and placed on the ground. The line 152 runs through the first 158A and second pulleys 158B, and the pulleys 158 are configured to guide the line 152 when the winch 150 is activated to retract the drawer 140 to which the line 152 is connected. The line 152 may run from a first end coiled onto the spool 156 through the first pulley 158A and then through the second pulley 158B, and a second end of the line 152 may be attached to the first pulley 158A. Thus, a block and tackle pulley 158 system may be utilized, which may be rigged with a single rope 152 section. Alternatively, the pulley system may be rigged with additional rope sections. The line 152 utilized is preferably rope, but other suitable types of flexible line 152 may be utilized, such as a cable, belt, cord, or wire.

In a preferred embodiment, the winch 150 may comprise a hand crank 154 designed to manually operate the winch 150. A user may rotate the handle of the hand crank 154 to draw line 152 onto the spool 156 in order to pull the drawer 140 along the track 180 and into the chair compartment 116 to move the drawer 140 into the storage position. When the user wants to move the drawer 140 out of the chair compartment 116 into the loading position, the user may pull end 190 of the drawer 140 to slide the drawer 140 along the track 180 and out of the chair compartment 116, which may cause line 152 to uncoil from the spool 156. The user may then place end 190 onto the ground adjacent to the vehicle 102 while end 192 remains connected to the track 180, as shown in FIG. 5, to load or unload chairs 128. When the drawer 140 is retracted back into the chair compartment 116, the set of rollers 148 disconnected from the track 180 may reenter the track grooves 182 through the open end 186 of the track 180.

In an alternative embodiment, the winch 150 may include a motor that may be used to drive rotation of the spool 156 to draw line 152 back onto the spool 156 to retract the drawer 140 back into the storage position.

Figure 10:
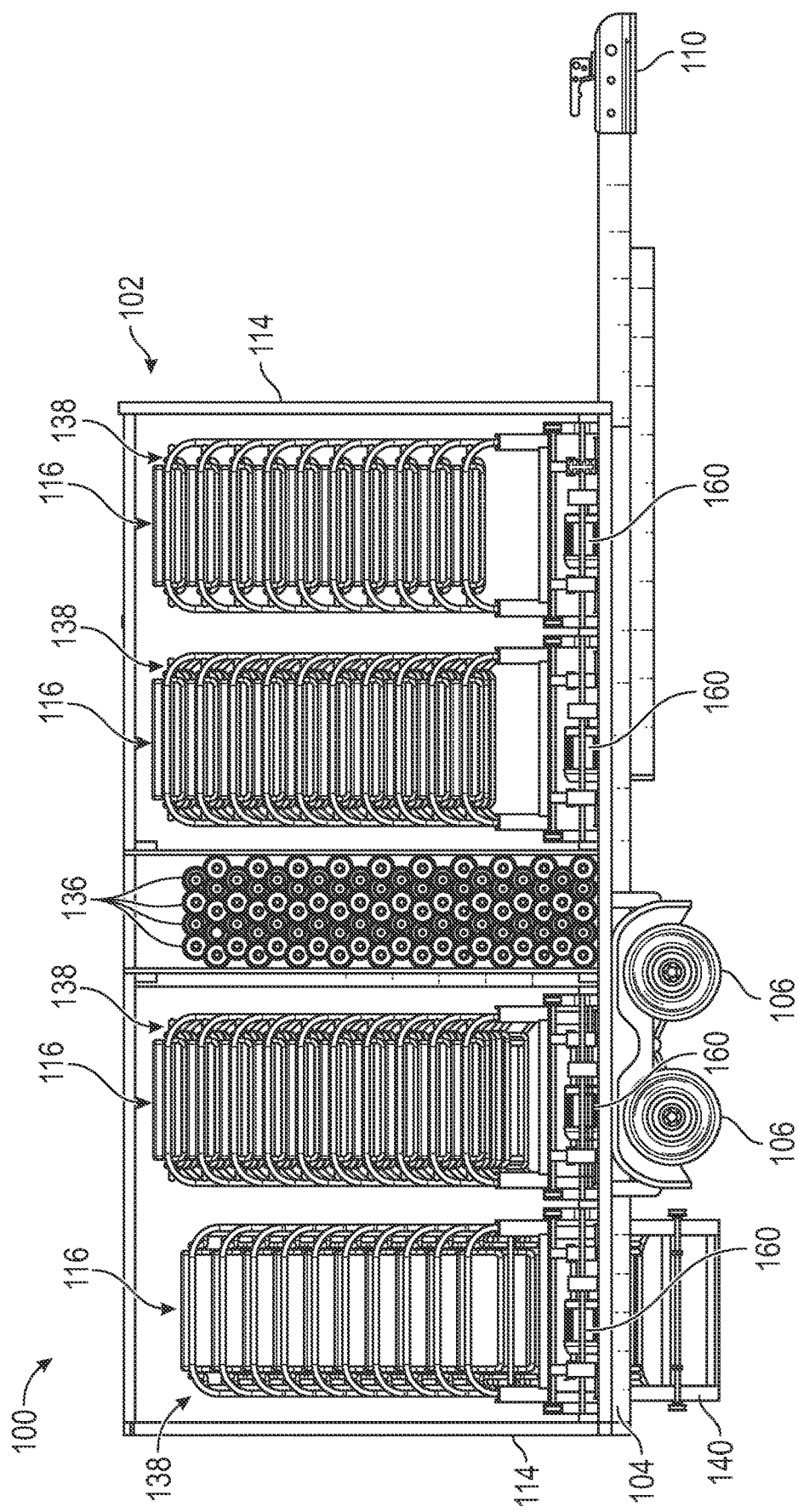
FIG. 10 is a side elevational view of a transport vehicle for stackable chairs utilizing a motorized system for loading chairs in accordance with the present disclosure.
Figure 11:
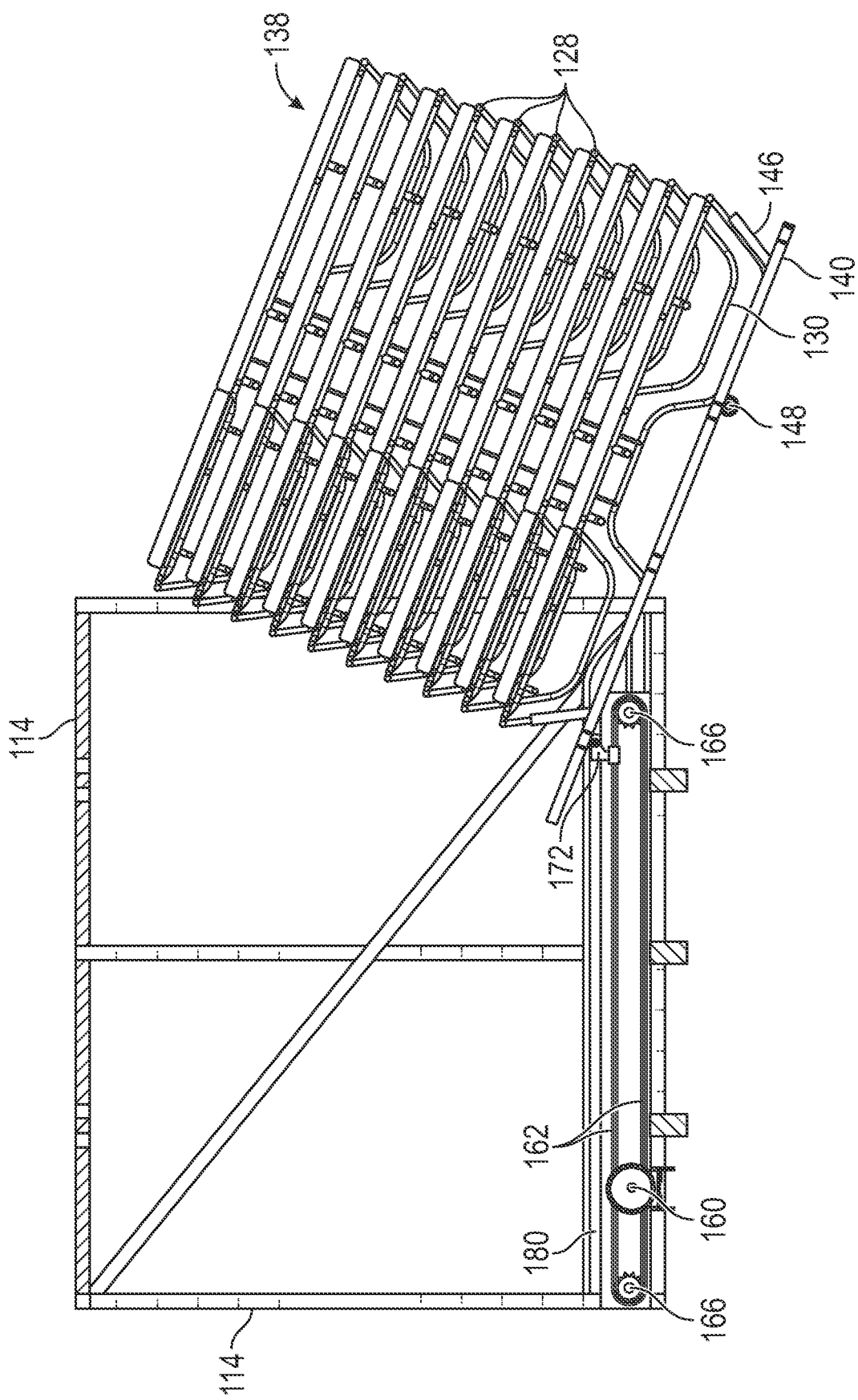
FIG. 11 is a partial rear elevational view of a transport vehicle for stackable chairs utilizing a motorized system for loading chairs in accordance with the present disclosure.
Figure 12:
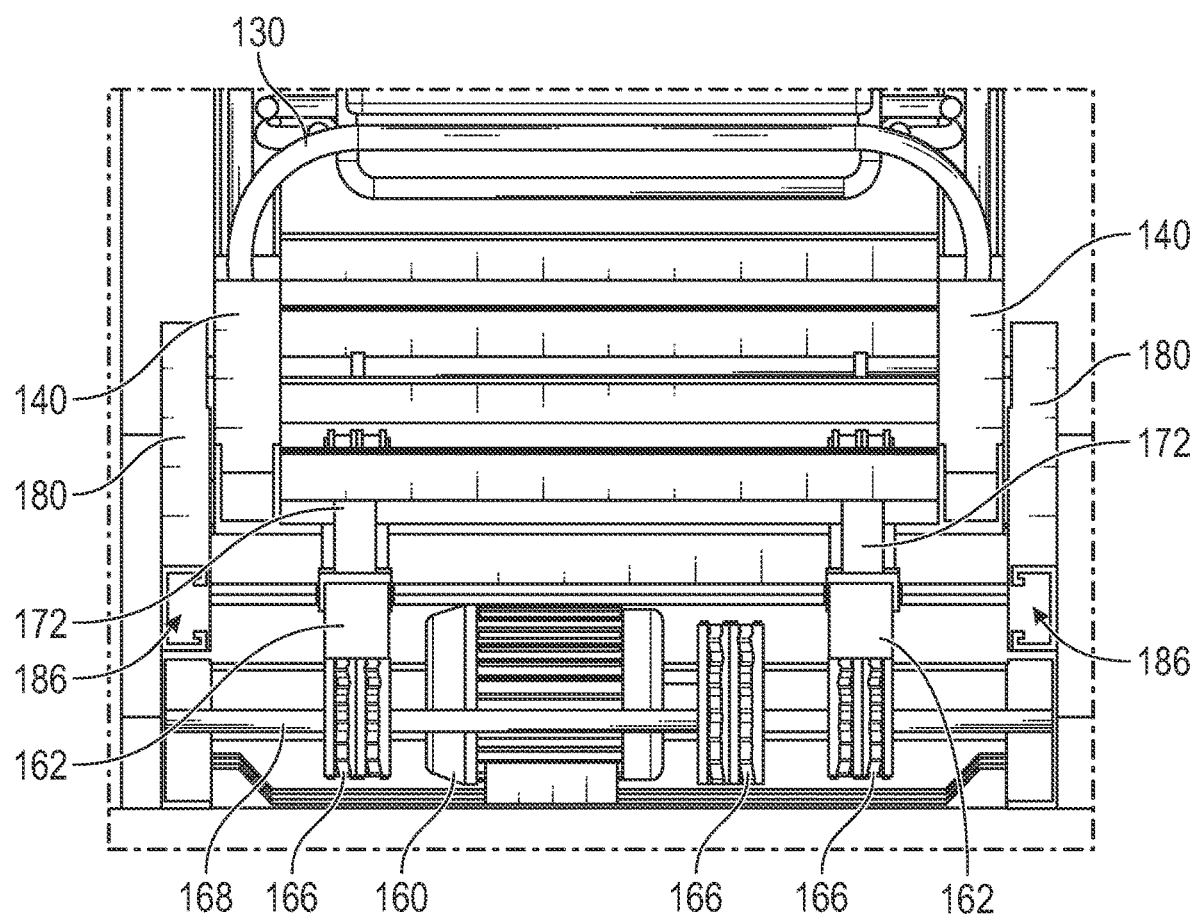
FIG. 12 is a partial perspective view of a motor and belt-driven drawer for loading stackable chairs in accordance with the present disclosure.
Figure 13:
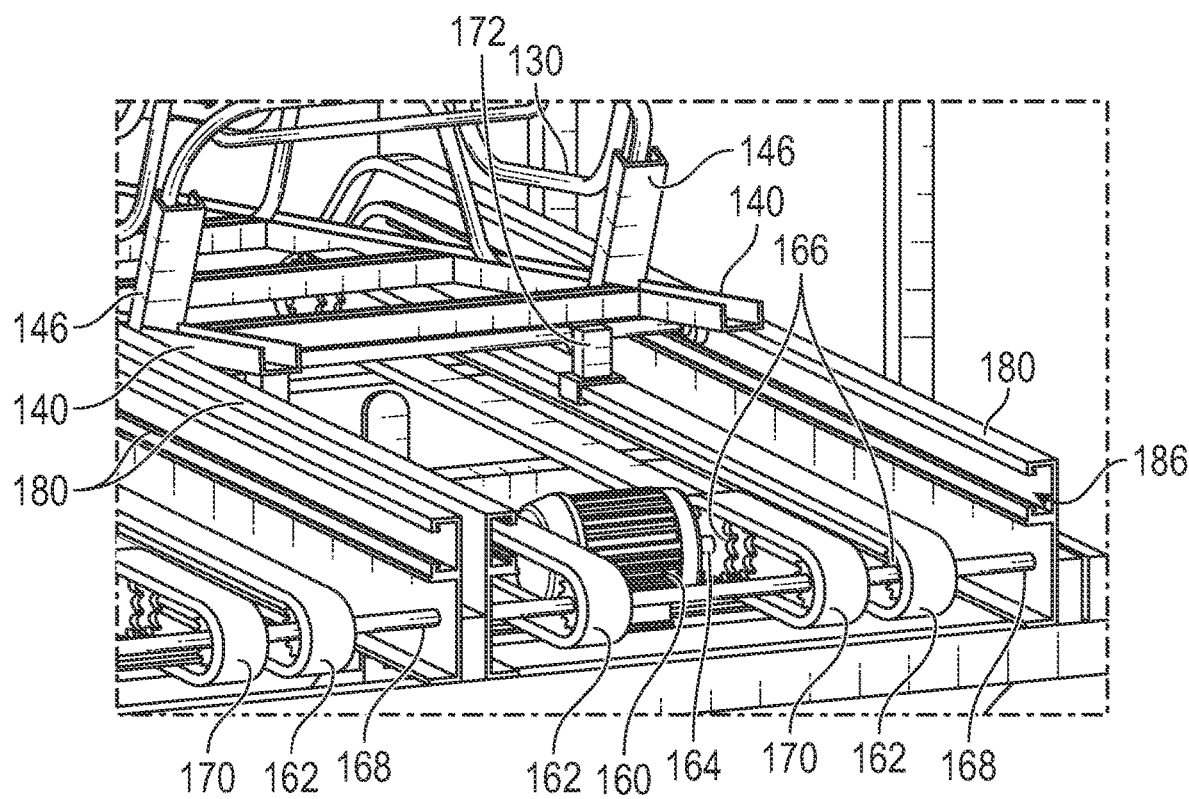
FIG. 13 is a partial perspective view of a motor and belt-driven drawer for loading stackable chairs in accordance with the present disclosure.

In another preferred embodiment, as shown in FIGS. 8-14, the transport vehicle 102 comprises a motor 160 that is mounted onto the vehicle 102. The motor 160 is operatively connected to a drive belt 162 configured to drive motion of a drawer 140 back and forth between the loading position and the storage position. As best seen in FIGS. 9 and 10, the vehicle 102 preferably comprises a plurality of motors 160 such that one motor 160 is associated with each respective chair compartment 116 and is utilized for each respective drawer 140. FIG. 11 shows a partial cross-sectional view of the vehicle 102 in which one motor 160 is shown being utilized for one drawer 140. FIGS. 12 and 13 show close-up views of one of the motors 160 with portions of the track 180 and drawer frame 140. In a preferred embodiment, each motor 160 comprises a drive shaft 164 operatively connected to the drive belt 162. The drive belt 162 may be attached to the drawer frame 142 of a drawer 140 by an attachment element 172. As best seen in FIG. 13, the attachment element 172 may include a portion that wraps around the drive belt 162 and is fixedly attached to the drive belt 162. The attachment element 172 may also include a portion that extends upwardly from the drive belt 162 and that is pivotally attached to the drawer 140 to drive motion of the drawer 140 when the drive belt 162 moves, as best seen in FIG. 11.

In a preferred embodiment, the drive shaft 164 may be operatively connected to the drive belt 162 by a plurality of sprockets 166 and a second drive belt 170. The vehicle 102 may optionally include two drive belts 162 for each drawer 140 so that one drive belt 162 is attached to each of the opposing frame members 142A and 142B of each drawer 140 by an attachment element 172, which may provide more efficient movement of the drawers 140 by the motors 160. Each of the belts 162 and 170 may have ridged inner surfaces to engage with the sprockets 166. Alternatively, drive pulleys may be utilized instead of sprockets. The vehicle 102 may include a second drive shaft 168, as best seen in FIG. 13. The second drive shaft 168 may be mounted onto the frame 114 of the vehicle 102 so that the second drive shaft 168 may rotate freely. The second drive shaft 168 may be operatively connected to the main drive shaft 164 of the motor 160 by the second drive belt 170 so that the main drive shaft 164 drives rotation of the second drive shaft 168, which then drives both drive belts 162 to drive motion of the drawer 140. Both drive shafts 164 and 168 may have sprockets 166 attached thereto at the points where the drive shafts are connected to drive belts 162 and 170. As shown in FIG. 8, drive belts 162 are preferably closed loop belts with an idler sprocket 166 disposed opposite the sprockets 166 attached to the second drive shaft 168. However, drive belts 162 preferably do not move in a continuous loop. The motors 160 are preferably configured to move the drive belts 162 back and forth only a distance sufficient to move each drawer 140 between the loading position and the storage position in which each drawer 140 is retracted fully back into its chair compartment 116. Thus, attachment elements 172 may move only between the sprockets 166 at opposing ends of the drive belts 162 such that the attachment elements 172 do not contact any of the sprockets 166 during operation of the motors 160. The vehicle 102 may include control switches for activating each of the motors 160 to drive rotation of the main drive shaft 164 of each motor 160 in both clockwise and counterclockwise rotational directions. The vehicle 102 may also include one or more batteries installed on the vehicle 102 for powering the motors 160.

Figure 14:
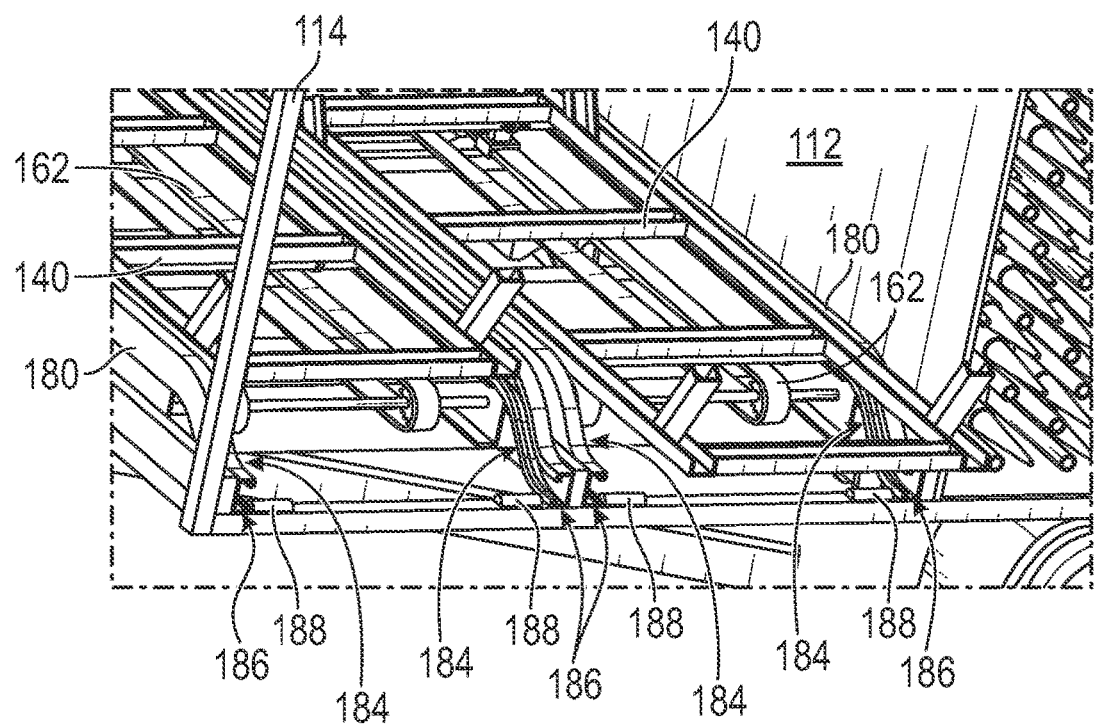
FIG. 14 is a partial perspective view of a motor and belt-driven drawer for loading stackable chairs in accordance with the present disclosure.

FIG. 14 shows a close-up view of an end 186 of the track 180 disposed at the open lateral side 120 of the vehicle 102 at which one of the drawers 140 is configured to move out of a corresponding chair compartment 116 into the loading position. At this end 186, the track 180 preferably has an end section 184 that is curved downwardly. As shown in FIG. 14, the end section 184 preferably curves downwardly and then curves back to level off so that the groove 182 at the very end 186 of the track 180 extends generally parallel to the groove 182 of a main portion of the track 180 that is generally straight as it extends toward the curved end section 184. The curved end section 184 allows end 190 of the drawer 140 to move in a direction so that end 190 is angled downwardly relative to the main portion of the track 180 as the drawer 140 is moved out of the chair compartment 116 into the loading position, which may help the user to lower end 190 down onto the ground surface adjacent to the vehicle 102. As shown in FIG. 14, the vehicle 102 may include curved buffer elements 188 attached to the frame 114 in a position so that drawer frame members 142A and 142B contact and slide along a top side of the curved buffer elements 188 as the drawer 140 is moved out of the chair compartment 116 into the loading position. The buffer elements 188 may be constructed of a rubber or plastic material that reduces friction and prevents metal components from rubbing against each other.

The foregoing description of the specified embodiments will so fully reveal the general nature of the invention so that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments based on the teaching and guidance presented herein. It is to be understood that phraseology or terminology herein is for the purpose of description and not for limitation, such that the terminology or phraseology of the present specification is to be interpreted by the skilled artisan in light of the teachings and guidance.

What is claimed is:

1. A transport vehicle comprising:
   a plurality of chair compartments disposed on a top side of a bed of the transport vehicle, wherein each chair compartment is sized to receive a vertical stack of chairs therein;
   a plurality of drawers each associated with a respective one of the plurality of chair compartments, wherein each of the drawers is sized and shaped to support the stack of chairs and to retain the stack of chairs in a laterally and longitudinally fixed position relative to the drawer,
   wherein each of the drawers comprises a drawer frame that is slidably connected to a track that is mounted on the top side of the bed, wherein each of the drawers is configured to move into and out of a respective one of the chair compartments between a loading position in which the drawer is extended outside the chair compartment and a storage position in which the drawer is retracted into the chair compartment;
   a winch attached to the transport vehicle; and
   a line operatively connected to the winch and to a respective one of the drawers, wherein the winch is configured to retract the drawer to which the line is connected from the loading position to the storage position.

2. The transport vehicle of claim 1, further comprising a first pulley and a second pulley, wherein the first pulley is connected to a vehicle frame of the transport vehicle, and the second pulley is connected to a respective one of the drawers, wherein the line runs through the first and second pulleys, wherein the first and second pulleys are configured to guide the line when the winch is activated to retract the drawer to which the line is connected.

3. The transport vehicle of claim 1, wherein the winch comprises a hand crank designed to manually operate the winch.

4. The transport vehicle of claim 1, wherein the drawer frame of each respective one of the drawers comprises two opposing drawer frame members disposed parallel to each other, wherein each of the drawer frame members has a groove on an upper side of the drawer frame member, wherein each groove is sized to receive a chair frame member of a bottom chair of the stack of chairs.

5. The transport vehicle of claim 4, wherein the drawer frame of each respective one of the drawers comprises a plurality of retaining members each attached to and extending upwardly from a respective one of the drawer frame members, wherein the retaining members are designed to limit longitudinal movement of the stack of chairs along the drawer frame members.

6. The transport vehicle of claim 1, wherein each of the chair compartments has an open side along a lateral side of the transport vehicle such that each of the drawers can be moved into and out of a respective one of the chair compartments along the track through the open side.

7. The transport vehicle of claim 1, wherein the bed is operatively connected to wheels configured to move the vehicle in a conveyance direction, wherein each of the drawers is configured to move along the track in a direction that is transverse to the conveyance direction.

8. The transport vehicle of claim 7, wherein the direction that is transverse to the conveyance direction is generally perpendicular to the conveyance direction.

9. The transport vehicle of claim 1, wherein the transport vehicle further comprises an umbrella compartment sized to receive a plurality of collapsible umbrellas therein.

10. The transport vehicle of claim 9, wherein the umbrella compartment is disposed between two chair compartments of the plurality of chair compartments.

11. A transport vehicle comprising:
a plurality of chair compartments disposed on a top side of a bed of the transport vehicle, wherein each chair compartment is sized to receive a vertical stack of chairs therein;
a plurality of drawers each associated with a respective one of the plurality of chair compartments, wherein each of the drawers is sized and shaped to support the stack of chairs and to limit lateral and longitudinal movement of the stack of chairs relative to the drawer, wherein each of the drawers comprises a drawer frame that is slidably connected to a track that is mounted on the top side of the bed, wherein each of the drawers is configured to move into and out of a respective one of the chair compartments between a loading position in which the drawer is extended outside the chair compartment and a storage position in which the drawer is retracted into the chair compartment; and
a motor mounted onto the transport vehicle, wherein the motor is operatively connected to a drive belt configured to drive motion of a respective one of the drawers back and forth between the loading position and the storage position.

12. The transport vehicle of claim 11, wherein the motor comprises a drive shaft operatively connected to the drive belt, wherein the drive belt is attached to the drawer frame of a respective one of the drawers.

13. The transport vehicle of claim 11, wherein the track has an end section that is curved downwardly at an end of the track at which a respective one of the drawers is configured to move out of a respective one of the chair compartments.

14. The transport vehicle of claim 11, wherein the drawer frame of each respective one of the drawers comprises two opposing drawer frame members disposed parallel to each other, wherein each of the drawer frame members has a groove on an upper surface of the drawer frame member, wherein each groove is sized to receive a chair frame member of a bottom chair of the stack of chairs.

15. The transport vehicle of claim 14, wherein the drawer frame of each respective one of the drawers comprises a plurality of retaining members each attached to and extending upwardly from a respective one of the drawer frame members, wherein the retaining members are designed to limit longitudinal movement of the stack of chairs along the drawer frame members.

16. The transport vehicle of claim 11, wherein each of the chair compartments has an open side along a lateral side of the transport vehicle such that each of the drawers can be moved into and out of a respective one of the chair compartments along the track through the open side.

17. The transport vehicle of claim 11, wherein a bed is operatively connected to wheels configured to move the transport vehicle in a conveyance direction, wherein each of the drawers is configured to move along the track in a direction that is transverse to the conveyance direction.

18. The transport vehicle of claim 17, wherein the direction that is transverse to the conveyance direction is generally perpendicular to the conveyance direction.

19. The transport vehicle of claim 11, wherein the transport vehicle further comprises an umbrella compartment sized to receive a plurality of collapsible umbrellas therein.

20. The transport vehicle of claim 19, wherein the umbrella compartment is disposed between two chair compartments of the plurality of chair compartments.

* * * * *